United States Patent
Lorenc et al.

[15] 3,666,664

[45] May 30, 1972

[54] COMPOSITIONS AND METHODS FOR CONTROLLING SCALE

[72] Inventors: Walter F. Lorenc, Harvey; Roland A. Berner, Tinley Park, both of Ill.

[73] Assignee: Nalco Chemical Company, Chicago, Ill.

[22] Filed: May 12, 1971

[21] Appl. No.: 142,822

[52] U.S. Cl. ..................................210/58, 252/180, 260/500
[51] Int. Cl. ..............................................................C02b 5/06
[58] Field of Search......................210/58; 252/180; 260/500

[56] References Cited

UNITED STATES PATENTS 3,549,538  12/1970  Jacklin.....................................210/58
3,393,150  7/1968   Ralston....................................210/58

*Primary Examiner*—Michael Rogers
*Attorney*—John G. Premo, Charles W. Connors and Edward A. Ptacek

[57] ABSTRACT

Compositions and methods used to inhibit scale formation and/or the formation of solid scale forming salts comprises adding to water small amounts of a synergistic combination of nitrilotriacetic acid and a specific organophosphate.

12 Claims, No Drawings

COMPOSITIONS AND METHODS FOR CONTROLLING SCALE

INTRODUCTION

Most commercial waters contain alkali earth metal cations such as calcium, barium, magnesium, etc., and several anions such as bicarbonate, carbonate, sulfate, oxylate, phosphate, silicate, fluoride, etc. When combinations of these anions and cations are present in concentrations which exceed the solubility of their reaction products, precipitates form until these product solubility concentrations are no longer exceeded. For example, when the concentrations of calcium ion and carbonate exceed the solubility of the calcium carbonate reaction product a solid phase of calcium carbonate will form. Solubility product concentrations are exceeded for various reasons, such as evaporation of the water phase, change in pH, pressure or temperature, and the introduction of additional ions which form insoluble compounds with the ions already present in the solution.

As these reaction products precipitate on the surfaces of the water carrying systems they form scale. The scale prevents effective heat transfer, interferes with fluid flow, facilitates corrosive processes, and harbors bacteria. This scale is an expensive problem in many industrial water systems, causing delays and shut-downs for cleaning and removal.

Scale forming compounds can be prevented from precipitating by inactivating their cations with chelating or sequestering agents, so that the solubility of their reaction products is not exceeded. Generally, this requires many times as much chelating or sequestering agent as cation, and these amounts are not always desirable or economical.

Certain organophosphonates have been found to be effective as hardness stabilizers to prevent scale formation. These organophosphonates have been taught by Ralston, U.S. Pat. No. 3,393,150. Certain other compounds are known chelating agents such as nitrilotriacetic acid, and in particular, the sodium salt.

In many industrial applications the amount of treatment often used if based on a ratio of 2.1:1, chelate treatment to hardness ratio.

It would be a great advantage to the art if a method could be devised of using certain chelates or blends of chelates at a lower treatment level.

OBJECTS

It is an object of this invention to provide a stable chelating composition for the control of scale. More specifically, it is an object of this invention to prepare a stable composition containing a synergistic blend of chelating agents useful in an aqueous system.

It is a further object of this invention to provide a synergistic composition for scale control in boiler treatment at a lower treatment level than heretofore achieved.

Further objects will be evident to those skilled in the art.

THE INVENTION

This invention comprises a composition containing a synergistic blend of nitrilotriacetic acid and a specific organic phosphonate in a ratio ranging from 20:1 to 5:1. The trisodium salt of nitrilotriacetic acid is used and is hereinafter referred to as NTA. Many organophosphonates have been found useful for controlling scale. In particular, Ralston in U.S. Pat. No. 3,393,150 discloses organic amino methylene phosphonates of the formula:

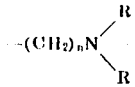

where R is

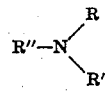

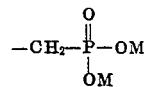

R' is selected from the group consisting of R and —CH$_2$CH$_2$OH; and R" is selected from the group consisting of R, —CH$_2$CH$_2$OH and $$-(CH_2)_nN\diagdown^R_R$$

n is a whole number from 1 to 6; and M is independently selected from the group consisting of H, NH$_4$, alkali metal, or combinations thereof. These compositions have been found useful under many conditions because they are readily soluble. The organic phosphonate material of this invention has the formula:

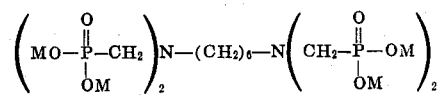

where M is selected from the group consisting of H, NH$_4$, alkali metal, or combinations thereof.

This organic amino methylene phosphonate can be easily prepared from the reaction of hexamethylene diamine, formaldehyde, and phosphorous acid. A particularly preferred phosphonate is the potassium salt of this organophosphonate, which can easily be made by adding potassium hydroxide to the organophosphonate. The potassium salt of this organophosphonate will hereinafter be referred to as OP-1. This organophosphonate material is also effective alone for preventing scale deposits in a water system.

This invention resides in the fact that certain synergistic combinations of nitrilotriacetic acid and this organophosphonate give unusual and unexpected results. Generally, the ratio of nitrilotriacetic acid to organophosphonate ranges from 20:1 to 5:1 and preferably from 10:1 to 8:1. Preferably, the nitrilotriacetic is in the form of the sodium salt and the organophosphonate is in the form of the potassium salt.

Therefore, this invention discloses a method of inhibiting the precipitation of scale forming salts in a water system which comprises adding to said system from 0.5 to 1,000 ppm of the synergistic combination or of the organophosphonate material. This method for preventing scale deposits is especially useful when the water contains at least one of barium sulfate, calcium sulfate, calcium carbonate, calcium silicate, magnesium carbonate and magnesium sulfate. An effective scale inhibiting amount of the synergistic combination is very useful in preventing scale formation on metal surfaces.

In order to test this synergistic combination the following tests and test equipment were used.

EVALUATION OF THE INVENTION

The test equipment used in the following test runs consists of an inclined tube experimental boiler with natural thermal circulation. Volume at normal operating level was 0.56 gallon. The water level itself was automatically controlled by 3 insulated electrodes which made contact with the boiler water to operate relays which controlled the feedwater pump and heating element. Pressure control was by manual adjustment of a needle valve in the condensed steam line. Boiler test specimens were low carbon steel tubes, 1 ½ inches O.D. × 10 inches long, closed at one end and flanged at the other. The tubes were bolted in the boiler at an angle of 30° from the horizontal with the closed end down. Heat was applied to the inside and water surrounded the outside. A soft corrugated copper gasket was used to seal the tube in the boiler. The test surface itself was cleaned and polished with No. 3/0 emery paper before each test. Tests were run in absence of chemical (blank) and in a comparative manner with varying dosages of test chemical. Percent scale prevention was then calculated by measuring deposition of scale upon the test specimen with benefit of chemical boiler additive, while using the blank run as a basis of comparison and a base of 0 percent reduction. Naturally, a blank run being without chemical additive gives no scale reduction.

The tests were run at ten concentrations, meaning that 10 volumes of water were boiled to give one volume for the test. Tests could have been conducted at 2, 50, 100 or any other concentration.

The feed water contained 4.3 ppm calcium and 2.1 ppm magnesium calculated as calcium carbonate. This is 6.4 ppm total hardness. The feed water also contained 1.5 ppm iron.

The tests were conducted at 450 psi. The following tests were run using various ppm of the organophosphonate material, OP-1, alone in the feed water.

TABLE I

| ppm Potassium Salt of the Organophosphonate | Scale Prevention |
|---|---|
| None | 0 |
| 0.1 | 25 |
| 0.5 | 60 |
| 1.0 | 65 |
| 5.0 | 65 |

This table shows the effect of the organophosphonate material by itself as a scale preventative.

In addition to the above, another test was performed with a slightly different test water at a higher pressure. The test water contained 3.0 ppm calcium and 3.0 ppm magnesium, calculated as calcium carbonate, for a total hardness of 6.0 ppm, 1.5 ppm iron and 10.6 ppm phosphate. The test was run at 900 to 1,200 psi. 40.0 ppm of the organophosphonate was added and the scale prevention was 65.

In order to compare the superiority of this organophosphate material to other materials, another organic phosphonate material was used, namely, that obtained from the reaction of ammonia, formaldehyde, and phosphorous acid. This organophosphonate will be hereinafter referred to as OP-2. The conditions were the same as in Table I.

TABLE II

| ppm Organophosphonate OP-2 | Scale Prevention |
|---|---|
| None | 0 |
| 0.2 | 20 |
| 0.5 | 45 |
| 1.0 | 10 |
| 2.0 | −10* |

*OP-2 material actually formed scale instead of preventing it at this dosage.

Comparison of Table I and Table II indicates the superiority of using the organophosphonate material OP-1 over the organophosphonate material OP-2. OP-2 is only effective at a low concentration after which additional treatment is harmful.

Another fact that was revealed by a series of tests showed that once a boiler had been exposed to as much as 5 ppm of the organophosphonate material OP-1 there remains a residual effect which is a persistence of scale prevention in the boiler system which provides additional scale protection. Insertion of a fresh, clean boiler tube heat transfer surface should under normal conditions give 0 scale prevention if no treatment has been added to the water. But tests show that after the tube or the boiler system has been exposed to the organophosphonate material OP-1, scale prevention occurred, even though no new treatment was used. This indicates another aspect of the superiority of OP-1 over OP-2 and other organophosphonates.

The following tests were run using nitrilotriacetic acid for scale prevention, and the same conditions as Table I.

TABLE III

| ppm NTA | Scale Prevention |
|---|---|
| None | 0 |
| 2 | 0 |
| 5 | 0 |
| 10 | 60 |
| 18 | 75 |

After the test in Table I was run, NTA was tested in the same system and the following results occurred.

TABLE IV

| ppm NTA | Scale Prevention |
|---|---|
| 10 | 70 |
| 5 | 70 |
| None | 65 |
| None | 60 |

This shows that there was a residual effect of the organophosphonate material OP-1. When there was no treatment the scale prevention should have been 0. It did not occur, indicating that not only is the organophosphonate material OP-1 more effective than normal organophosphonate materials, but also that it has a persistence which is not taught or disclosed by the prior art. It is thought that a type of film is forming on the surface which has a certain persistence which is unexpected. Most organophosphonate materials previously tested showed no such persistence.

Another series of tests were run showing the subject matter of this invention, namely, a NTA/OP-1 synergistic blend.

TABLE V

| ppm OP-1 | ppm NTA | Total ppm | Scale prevention |
|---|---|---|---|
| 1 | 5 | 6 | 70 |
| 1 | 10 | 11 | 80 |
| ½ | 10 | 10½ | 80 |

Test conditions were the same as in Table I.

In the following table, conditions were the same as in Table I, except the boiler pressure was 900 psi.

TABLE VI

| ppm OP-1 | ppm NTA | Total ppm | Scale prevention |
|---|---|---|---|
| ½ | 10 | 10½ | 75 |
| 1 | 10 | 11 | 75 |

Another table was run using a boiler pressure of 900 psi and the feed water contained 3.0 ppm calcium and 3.0 ppm magnesium calculated as calcium carbonate for a total hardness of 6.0 ppm calculated as calcium carbonate, 1.5 ppm iron and 10.6 ppm phosphate.

TABLE VII

| ppm OP-1 | ppm NTA | Total ppm | Scale prevention |
|---|---|---|---|
| ½ | 10 | 10½ | 80 |
| 1 | 10 | 11 | 75 |
| ¼ | 10 | 10¼ | 70 |
| 1/10 | 10 | 10-1/10 | 65 |

The ratio of 20:1, NTA/OP-1 showed the best results. Therefore, this ratio was incorporated with an antifoam and a processed lignite sludge conditioner and tested in another series of tests. In the preferred embodiment of the invention, the formulation contains an antifoam and ranges from 0.5 to 5 percent by weight of the composition.

In an even more preferred embodiment of the invention, the formulation contains a polymer either alone or in conjunction with the processed lignite sludge conditioner. Many polymers are known to those skilled in the art and have been found useful for preventing scale formation. For example the polymer could be a water soluble sulfoxy-free polar addition polymer.

These water soluble sulfoxy-free polar addition polymers encompass a large group of water soluble polymeric compounds. As indicated, these polymers should have a molecular weight of at least 1,000. As will be shown in some detail, the molecular weight of these polymers is not deemed critical to the success of the invention. It has been discovered that polymers having low, intermediate or high molecular weights all produce satisfactory results when used in the practice of this invention. When used herein the expression "low molecular weight," encompass polymers having a molecular weight range of from 1,000–40,000. Intermediate molecular weight polymers may be arbitrarily described as having molecular weights within the range of 40,000–500,000. High molecular weight polymers encompass all polymers having molecular weights greater than 500,000 and in some instances may be in excess of several million.

A particularly effective class of water soluble sulfoxy-free polar addition polymers have as a part of their molecular configuration at least 5 percent by weight of side chain groups which will be either anionic or which under conditions of alkaline hydrolysis are capable of being converted into anionic functional groups.

These anionic polymers desirably contain as a functional side-chain group, carboxylic acid groups, carboxylic anhydride groups, carboxylic salt groups, carboxylic acid ester groups or carboxylic acid amide groups. As indicated, in the case of the esters and amides, under normal alkaline boiler conditions these materials hydrolize to the alkali metal or alkaline earth metal salt form. The preferred water soluble anionic polymers are those described in Johston, U.S. Pat. No. 2,723,956. The disclosure of this patent is incorporated herein by reference.

Further discussion of these polymers is disclosed in U.S. Pat. No. 3,549,538, which is incorporated herein by reference.

The following formulation was used: the trisodium salt of NTA, 85.2 weight percent; OP-1, 4.3 percent; a processed lignite sludge conditioner, 8.4 percent; and an antifoam, 2.1 percent. The following results were obtained. This is known as Formulation 1.

TABLE VIII

| ppm Formulation 1 | Scale Prevention |
|---|---|
| 16 | 70 |
| 12 | 80 |
| 8 | 80 |
| 10 | 80 |

Feed water and test conditions were same as Table I.

The following tests were run using the same feed water as Table I but a pressure of 900 psi. Formulation 2 consisted of the following: 81.4 weight percent of trisodium salt of nitrilotriacetic acid; 8.1 weight percent of OP-1; 8.4 weight percent of processed lignite; and 2.1 weight percent of antifoam. Formulation 2 was tested in the following tests.

TABLE IX

| ppm Potassium Salt of the Organophosphonate | Scale Prevention |
|---|---|
| 10 | 90 |
| 10 | 90 |
| 10 | 90 |
| 8 | 85 |
| 12 | 85 |
| 14 | 90 |
| 16 | 90 |
| 20 | 95 |

Another formulation was also tested. Formulation 3, containing an NTA/OP-1 ratio of 10:1.5, was tested in the same feed water. At 10 ppm Formulation 3, scale prevention was 90.

Another test was run using NTA trisodium salt as 89.5 weight percent, 8.4 percent processed lignite sludge conditioner, and 2.1 percent antifoam. This was tested at 10 ppm under similar test conditions and feed water as Table IX and the scale prevention was 70. A similar formulation was tested except that 1 ppm silica was included in the test water. The results were the same. This indicates that the OP-1 is indeed a necessary ingredient in the formulation to achieve effective scale prevention.

Scale prevention of 80 is a very good result. A scale prevention reading of 90 puts the product in a very exclusive class. The beneficial residual effects of the OP-1 provides long lasting protection which cannot be overemphasized. One of the main problems facing the users of boiler feed water chemicals is the poor control of feed water hardness or unexpected hardness leakages. This formulation will protect these boilers during this critical time.

SUMMARY

It has been shown that a synergistic blend containing from 20:1 to 5:1 ratio of NTA to OP-1 achieves unusual and synergistic results that had heretofore not been known to the art. This synergistic blend achieves unusual and unexpected results and is more than a mere addition of two known chelates as scale prevention additives. The product composition can be varied to include organic polymers such as polyacrylates, acrylamide acrylate copolymers, styrene maleic anhydride, hydrolyzed polyacrylonitrile, and others known to those skilled in the art. A new lower treatment level is possible using this combination than was previously known in the art. Additionally, a residual effect hereinreferred to as persistence provides deposit prevention for a time after the product application has stopped.

What we claim and desire to protect by Letters Patent is:

1. A liquid scale preventative composition comprising a combination of nitrilotriacetic acid and an organophosphate material having the formula:

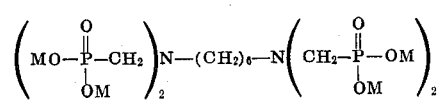

where M is selected from the group consisting of H, NH$_4$, alkali metal and combinations thereof; wherein the ratio of nitrilotriacetic acid to organophosphate ranges from 20:1 to 5:1.

2. The composition of claim 1 in which the nitrilotriacetic acid is present as the sodium salt.

3. The composition of claim 1 in which the organophosphonate is present as the potassium salt.

4. The liquid scale preventative composition of claim 1 which additionally contains from 1 to 10 percent by weight of a processed lignite.

5. A method of inhibiting the precipitation of scale forming salts in a water system comprising adding to said system from 0.5 to 1,000 ppm of the composition of claim 1.

6. A process for preventing scale deposits of at least one of barium sulfate, calcium sulfate, calcium carbonate, calcium silicate, magnesium sulfate and magnesium carbonate on metal surfaces and contact with water containing said scale forming chemicals which comprises contacting said metal surfaces with said water while maintaining therein an effective scale inhibiting amount of the composition of claim 1.

7. A method of inhibiting the precipitation of scale forming salts in a boiler system which comprises adding to said system from 0.5 to 1,000 ppm of the composition of claim 1.

8. The composition of claim 1 which comprises the additional ingredient of an antifoam.

9. The composition of claim 8 in which the antifoam comprises from 0.5 to 5 percent by weight of the composition.

10. The composition of claim 1 which comprises the additional ingredient of a polymer.

11. The composition of claim 10 in which the polymer comprises from 0.5 to 15 percent by weight of the composition.

12. The composition of claim 11 in which the polymer is a water soluble, sulfoxy-free polar addition polymer having a molecular weight of at least 1,000.

* * * * *

UNITED STATES PATENT OFFICE
CERTIFICATE OF CORRECTION

Patent No. 3,666,664  Dated May 30, 1972

Inventor(s) Walter F. Lorenc and Roland A. Berner

It is certified that error appears in the above-identified patent and that said Letters Patent are hereby corrected as shown below:

Column 1, line 9, after "carbonate" read -- ion --.
Column 5, line 57, for "Johston" read -- Johnston --.

Signed and sealed this 2nd day of January 1973.

(SEAL)
Attest:

EDWARD M. FLETCHER, JR.
Attesting Officer

ROBERT GOTTSCHALK
Commissioner of Patents